Patented Oct. 31, 1950

2,527,809

UNITED STATES PATENT OFFICE 2,527,809

ORGANOSILOXANES

John T. Goodwin, Jr., Midland, Mich., assignor to Dow Corning Corporation, Midland, Mich., a corporation of Michigan No Drawing. Application March 19, 1949, Serial No. 82,478

1 Claim. (Cl. 260—448.2)

The present invention relates to new organosilicon copolymers and their production.

The present organosilicon industry is based upon siloxanes which are materials in which the silicon atoms are linked by oxygen atoms. Another type of silicon compound is one in which the silicon atoms are linked directly to each other. Still a third type is one in which the silicon atoms are linked by organic radicals. The copolymers prepared in accord herewith contain both siloxane and methylene linkages.

I have heretofore found that principally the cyclic dimer of the unit

—Si(CH$_3$)$_2$CH$_2$Si(CH$_3$)$_2$O— is obtained from the hydrolysis of

Y(CH$_3$)$_2$SiCH$_2$Si(CH$_3$)$_2$Y where each Y represents a substituent of the group consisting of alkoxy radicals and halogen atoms; the remaining material is a low polymer which has a viscosity at 25° C. of 66 cs. However, I have now found that when varying amounts of a composition containing units Si(CH$_3$)$_2$O are added to the dimer and the mixture copolymerized, high molecular weight copolymers are produced containing —Si(CH$_3$)$_2$CH$_2$Si(CH$_3$)$_2$O— units.

The products of the present invention are organosiloxane copolymers in which the silicon atoms are linked in pairs by oxygen atoms and by methylene radicals, whereby the copolymers contain structures of the type ≡SiCH$_2$Si≡. No adjacent pairs of silicon atoms are linked by methylene radicals, whereby the copolymers do not contain any structures of the type ≡SiCH$_2$SiCH$_2$Si≡

All other bonds of the silicon atoms are satisfied by methyl radicals. These copolymers contain an average of from ½ to 50 Si(CH$_3$)$_2$O units per ≡SiCH$_2$Si≡. The copolymers contain between 1.98 and 2.1 methyl radicals per silicon atom.

The copolymers produced in accord herewith are fluids of varying viscosity up to copolymers which are non-flowing at room temperatures when the polymer contains from 2 to 2.1 radicals and they are elastic gels when the polymer contains from 1.98 to less than 2 such radicals. These gels are of use for the production of silicone rubber.

The hydrolysis of Cl(CH$_3$)$_2$SiCH$_2$Si(CH$_3$)$_2$Cl and of (CH$_3$)$_2$SiCl$_2$ to give the copolymers of this invention, may be carried out in two ways.

Cl(CH$_3$)$_2$SiCH$_2$Si(CH$_3$)$_2$Cl and (CH$_3$)$_2$SiCl$_2$ may be mixed and cohydrolyzed and condensed by any of the methods known in the art. In such a process the reaction may be carried out either with or without a catalyst and in the presence or absence of a solvent. The compounds Cl(CH$_3$)$_2$SiCH$_2$Si(CH$_3$)$_2$Cl and (CH$_3$)$_2$SiCl$_2$ may be hydrolyzed separately and the products,

[(CH$_3$)$_2$SiCH$_2$Si(CH$_3$)$_2$O]$_2$ and [(CH$_3$)$_2$SiO]$_n$ so obtained, may be mixed and copolymerized by contacting them with fuming sulfuric acid.

The preparation of the compound

Cl(CH$_3$)$_2$SiCH$_2$Si(CH$_3$)$_2$Cl may be accomplished by reacting

Cl$_2$CH$_3$SiCH$_2$SiCl$_3$ with a methyl Grignard in amount sufficient to replace three of the chlorine atoms with methyl radicals. While as is known with materials of the siloxane type it is to be preferred that the extent of the prime units derived from these intermediates be in preponderating amount in the copolymer, as for example over 90% of the number of siloxane units, other units may be included as by the addition of varying amounts of trimethylsiloxane which may be included as units in the copolymer, if desired.

The fluids hereof are of considerable utility as lubricants. The products hereof have pour points below —70° C. This is lower than the pour point of dimethylpolysiloxane. The products hereof are likewise of substantial value in preventing foaming of hydrocarbons, such as petroleum lubricating oils and in systems involving mixtures of organic materials and water where foaming is encountered, such as in the production of yeast.

The following examples illustrate the method of the present invention.

Example 1

A mixture of 66.6 parts by weight of [(CH$_3$)$_2$SiO]$_4$, 14.6 parts of

[(CH$_3$)$_2$SiCH$_2$Si(CH$_3$)$_2$O]$_2$ and .8 part of [(CH$_3$)$_3$Si]$_2$O was prepared. 3.2 parts of 30% fuming sulfuric acid were then added and the mixture stirred. 1.6 parts of H$_2$O were next added and the mixture again stirred. After standing overnight the polymer was diluted with benzene, washed, dried over anhydrous Na$_2$CO$_3$, and filtered. Nitrogen gas was then bubbled through at 80° C. to remove the benzene. This polymer was found to have a viscosity at 25° C. of 366 cs., a refractive index of 1.4116 at 25° C., a density of 0.9607 at 25° C., and a specific refraction of 0.2587. After devolatilization this polymer was found to have a melting point of −80° C., a viscosity at 25° C. of 482 cs., a refractive index of 1.4111 at 25° C., a density of 0.9610 at 25° C., and a specific refraction of 0.2585.

*Example 2*

A mixture of 66.6 parts by weight of $[(CH_3)_2SiO]_4$ 14.6 parts of $[(CH_3)_2SiCH_2Si(CH_3)_2O]_2$, and .08 part of $[(CH_3)_3Si]_2O$ was prepared, 3.2 parts of 30% fuming sulfuric acid were then added and the mixture stirred. Then 1.6 parts of $H_2O$ were added. After standing overnight, the polymer was diluted with benzene, washed, and filtered. Nitrogen gas was then bubbled through at 80° C. to remove benzene. The polymer was found to have a viscosity at 25° C. of 40,850 cs., a refractive index of 1.421 at 25° C., a density of 0.973 at 25° C., and a specific refraction of 0.2558. After devolatilization, the polymer was found to have a melting point of −72° C., a viscosity of 46,900 at 25° C., a refractive index of 1.4122 at 25° C., a density of 0.973 at 25° C., and a specific refraction of 0.2558.

*Example 3*

A mixture of 73.2 parts by weight of $[(CH_3)_2SiO]_4$ 1.46 parts of $[(CH_3)_2SiCH_2Si(CH_3)_2O]_2$, and .75 part of $[(CH_3)_3Si]_2O$ was prepared. 3 parts of 30% fuming sulfuric acid and 1.5 parts of $H_2O$ were added. This reaction was conducted as in Example 2. This polymer was found to have a viscosity at 25° C. of 3.430 cs., a refractive index of 1.4040 at 25° C., a density of 0.9660 at 25° C., and a specific refraction of 0.2532. After devolatilization, the polymer was found to have a melting point of −48° C., a viscosity at 25° C. of 4,930 cs., a refractive index of 1.4043 at 25° C., a density of 0.9686 at 25° C., and a specific refraction of 0.2527.

*Example 4*

21.5 parts by weight of $[(CH_3)_2SiO]_4$, 42 parts of $[(CH_3)_2SiCH_2Si(CH_3)_2O]_2$ and 6 parts of $[(CH_3)_3Si]_2O$ were mixed. 2.4 parts of 30% fuming sulfuric acid and 1.2 parts of $H_2O$ were added. The reaction was conducted as in Example 2. This polymer was found to have a viscosity at 25° C. of 325 cs., a refractive index of 1.4312 at 25° C., a density of 0.9428 at 25° C., and a specific refraction of 0.2747. After devolatilization, this polymer was found to have a melting point of −79° C., a viscosity at 25° C. of 522 cs., a refractive index of 1.4317 at 25° C., a density of 0.9485 at 25° C., and a specific refraction of 0.2733.

*Example 5*

A mixture of 37 parts by weight of $[(CH_3)_2SiO]_4$ and 36 parts of $[(CH_3)_2SiCH_2Si(CH_3)_2O]_2$ was prepared. 1.5 parts of 30% fuming sulfuric acid were then added and the mixture stirred. .75 parts of $H_2O$ were next added and the mixture again stirred. After standing overnight, the polymer was diluted with benzene, washed, dried over anhydrous $Na_2CO_3$ and filtered. Nitrogen gas was then bubbled through at 80° C. to remove the benzene. 40% of the polymer was removed as low polymers. The residue was a thick, viscous oil which was found to have a density of 0.9543 at 25° C., a refractive index of 1.4312 at 25° C., a specific refraction of 0.2712 and a viscosity at 25° C. of 10,993 cs.

That which is claimed is:

An organosiloxane copolymer in which the silicon atoms are linked in pairs by oxygen atoms and by methylene radicals, whereby the copolymer contains structure of the type $\equiv SiCH_2Si\equiv$, said copolymer being free of methylene radicals linking adjacent pairs of silicon atoms, whereby the copolymer does not contain any structures of the type $\equiv SiCH_2SiCH_2Si\equiv$, all other bonds of the silicon atoms being satisfied by methyl radicals and which copolymer contains an average of from ½ to 50 $Si(CH_3)_2O$ units per $\equiv SiCH_2Si\equiv$, said copolymer containing between 1.98 and 2.1 methyl radicals per silicon atom.

JOHN T. GOODWIN, Jr.

REFERENCES CITED

The following references are of record in the file of this patent:

Bluestein, Jour. Am. Chem. Soc., vol 70 (1948) pages 3068–3071.